UNITED STATES PATENT OFFICE.

RUSSELL THAYER, OF PHILADELPHIA, PENNSYLVANIA.

PROCESS FOR THE EXTRACTION OF PLATINUM AND SIMILAR METALS FROM THEIR SANDS AND ORES.

1,355,186. Specification of Letters Patent. Patented Oct. 12, 1920.

No Drawing. Application filed January 23, 1920. Serial No. 353,631.

*To all whom it may concern:*

Be it known that I, RUSSELL THAYER, a citizen of the United States, residing in Philadelphia, in the county of Philadelphia and State of Pennsylvania, have invented certain new and useful Improvements in Processes for the Extraction of Platinum and Similar Metals from Their Sands and Ores, whereof the following is a specification.

My invention relates to the extraction of platinum metals (*i. e.*, those of the so-called platinum group, which are commonly found in nature associated with platinum) from ores in which these noble metals exist in a finely divided or even colloidal state. As an example of such ores may be cited the sands characteristic of the deposit of Herkimer county, New York.

There is reason to believe that the finely divided metals in both sand and rock ores are, largely, dried, coagulated gels from colloidal aqueous solutions, and that in many cases silica was also present in these solutions. The silica may have been either itself in a state of colloidal fineness and solution, or in particles, coarser than colloidal, suspended in the true colloidal solution of metal particles. In some cases, these latter relations may have been wholly or partially reversed, as between silica and metal; and in others, again, all the possible relations probably coexisted.

Whatever be the fact as to previous solution, it certainly appears that, geologically speaking, the metal particles in such sand and rock ores have been coagulated or precipitated upon grains of silica which constitute, or, in aggregate, form the ores,— or which, perhaps, in the case of rock ores, exist in the matrix of cementing material that binds together the aggregate of sand grains whereof the rock is principally composed.

In my Patents 1,273,202, dated July 23rd, 1918, and 1,281,878 and 1,281,879, dated October 15th, 1918, and in my applications Serial No. 306,774, filed June 26th, 1919, and Serial No. 353,632 filed contemporaneously herewith, I have described methods for the extraction of the platinum metal values from sands and other ores by volatilization,—for I have found that, in their finely divided or colloidal state characteristic of such ores, these metals can be volatilized at relatively low temperatures,—notwithstanding their high melting points and high specific gravities. I have also described (in my patents and my applications just mentioned) the use of various agents in aid of the volatilization according to the principles of my invention. These auxiliary agents include, in particular, alkali and alkaline earth metal compounds and halogens or halogenous agents, and especially halogen compounds of the alkali, and alkaline earth metals,—such as calcium chlorid, sodium chlorid, or fluorspar, singly or two or more together, and advantageously with addition of potassium or sodium hydroxid as an adjunct.

My present invention relates to the general process of extraction of platinum metals by volatilization, at relatively low temperatures, preferably with the aid of auxiliary agents,—but involves various improvements over the methods set forth in my aforesaid patents and applications. The invention relates both to the volatilization operation, as such, and also more broadly to the subsequent treatment of the product of this operation, or of the volatilizing step when conducted by my other processes (which products may be conveniently designated as platinous "fume"), for the recovery therefrom of the metal values or metal-containing components.

I have found that the volatilization operation can be improved, simplified, and cheapened, by conducting it, with halogenous agents, in the presence of water under suitable conditions. While it is a different matter to determine fully just how the water produces its beneficial effect, it appears to be the fact that this effect is due in part at least—to a reaction between the water and the halogenous agent, and to the action of the resultant products (probably in the nascent state) on the ore.

I have further found that the metallic value components of the platinum metal-containing fume, resulting from the volatilization step (whether performed as described in my prior patents and applications, or in the improved manner hereinafter described) can be recovered, with great advantage and economy, by entraining the metal value components of the fume in a liquid and subjecting the enriched liquid to electrolysis in such a way as to deposit the platinum metals.

The combination of the volatilization, broadly considered, and the electrical deposition constitutes, therefore, a complete and new process as a whole for the extraction of the metals.

How my invention can be practically carried out and applied in its several phases will appear from the description hereinafter of the best methods at present known to me, while its scope and essence will be indicated in my claims.

The following modes of procedure exemplify the practice of my invention.

Platiniferous sand or ore is preferably ground very fine, say about 200 mesh, in order to release the metal particles from their envelop. The degree of fineness depends, of course, on the character of the sand, or ore, and on its metallic content, since in many cases only slight grinding (or even none at all) may be proper to release the metal particles. To one dry ton (of 2000 lbs.) of this sand, or the like, is added an amount of finely divided sodium chlorid (common salt) preferably equal to about 8 to 10 per cent. thereof by weight, and the added material is intimately mixed with the body of sand, preferably with addition of sufficient water to moisten the charge throughout. The charge is then heated in a suitable container, furnace, or retort, to a temperature of some 200° centigrade to 800° centigrade until volatilization of the platinum metal is effected; for the Herkimer county sands, about two hours of heating will ordinarily suffice. The effluent end of the retort is connected with any suitable receptacle or means for collecting the volatilized metal, according to the method employed for its recovery. During the heating, superheated steam may advantageously be introduced into the container, through the charge, to afford the desired presence of water. This specific feature is not claimed in the present application, but forms the subject of a separate application Serial No. 353,632, filed contemporaneously herewith.

Under these conditions, hydrochloric acid and sodium hydroxid are formed,—the higher temperatures favoring the liberation of the chlorin and rendering the action more effective. The sodium hydroxid further releases, or cuts, the finely divided platinum metals from their silicious or other envelop and so prepares them to be readily acted on by the free hydrochloric acid. The latter seizes the platinous metals, and issues from the retort as a fume in which the metals appear to be present in a colloidal state, or as colloidal compounds.

Other halogenous agents, in lieu of common salt, may be used,—compounds such as calcium chlorid and fluorspar,—but common salt is commercially the cheapest, and believed by me to be the best.

The desired presence of water can be obtained otherwise than by blowing steam through the magma in the container,—as, for example, by addition of sufficient water to the charge before placing in the furnace, so that steam shall be formed therefrom in the heating of the charge,—a vaporous or gaseous condition of the water serving to promote its beneficial action.

For recovery of the metal values from the fume produced as just described, or according to other volatilization methods such as described in my prior patents and application, the fume may be led from the effluent end of the retort into a body of water, which results in dispersion, suspension, or solution of the metal value particles of the fume in the water. The metals are then recovered, as such, from this enriched liquid or solution by electrolysis, which can be accomplished by placing an anode and a cathode therein and passing a current of low voltage and amperage through the liquid,—preferably first slightly acidulating it with sulfuric acid to enhance the electrolytic action. Satisfactory results have been obtained with a current of three and a half ($3\frac{1}{2}$) volts and one half ($\frac{1}{2}$) ampere. The platinum metals will be deposited on the cathode, and by suitably varying the voltage and amperage of the current, platinum, and other metals, may be selectively recovered.

This feature of my invention is based upon the discovery that the platinum or similar metal exists in the receiving liquid in such form as to be capable of direct electrolytic separation and of either direct deposition on the cathode (where a direct current is employed,) or of precipitation in metallic form, when an alternating current is employed.

I believe this phenomenon to be due to the fact that the metal collected from the platinous fume exists in the form of a reversible colloid, as distinguished from what might be termed a normal metallic condition, or compound, and that such colloidal form lends itself to electrolytic separation in a peculiar manner. It will be understood, however, that this statement, is made merely as affording a possible explanation of the phenomenon and that the theory thus expressed is in no way essential to the invention.

Having thus described my invention, I claim:

1. A process of extracting platinum metals from their ores, which comprises volatilizing off in fume the metal values therefrom; entraining the metal value components of the fume in a liquid; and recovering the metal values from the metal enriched liquid by electrolysis.

2. A process of extracting platinum metals from their ores, which comprises heating the ore with a halogenous reagent and volatilizing off the metal values therefrom; bringing the metal value components of the resultant fume into liquid entrainment; and recovering the metal values therefrom by electrolysis.

3. A process of extracting platinum metals from their ores, which comprises heating the ore with a halogen alkali-metal compound and volatilizing off the metal values therefrom; passing the resultant fume into water to entrain the metal value components of the fume; and recovering the metal value components by electrolysis.

4. A process for the extraction of platinum metals from their ores by volatilization with the aid of a halogen alkali-metal agent which comprises effecting the volatilization of a temperature of 500° centigrade and upward in the presence of water vapor.

In testimony whereof, I have hereunto signed my name, at Philadelphia, Pennsylvania, this 21st day of January, 1920.

RUSSELL THAYER.

Witnesses:
JAMES H. BELL,
E. L. FULLERTON.